United States Patent [19]

Ecer

[11] 4,307,280
[45] Dec. 22, 1981

[54] METHOD FOR FILLING INTERNAL CASTING VOIDS

[75] Inventor: Günes M. Ecer, Murrysville, Pa.
[73] Assignee: Westinghouse Electric Corp., Pittsburgh, Pa.
[21] Appl. No.: 156,942
[22] Filed: Jun. 6, 1980
[51] Int. Cl.$^3$ ............................................. B23K 9/04
[52] U.S. Cl. ............................. 219/76.1; 29/156.8 B; 29/402.18; 29/402.21; 219/78.16; 219/149
[58] Field of Search ............ 219/50, 76.1, 149, 78.16; 29/156.8 B, 402.18, 402.21, 526.3, 526.4, 526.5

[56] References Cited

U.S. PATENT DOCUMENTS

| | | | |
|---|---|---|---|
| 1,294,193 | 2/1919 | Talbot | 29/526.3 |
| 2,554,328 | 5/1951 | Grimes | 219/78.16 |
| 2,888,244 | 5/1959 | Pekarek | 29/156.8 B |
| 3,229,361 | 1/1966 | Valcich | 29/402.18 |
| 3,606,785 | 9/1921 | Olsson . | |
| 3,989,918 | 11/1976 | Onarhelm | 219/76.1 |
| 4,050,133 | 9/1977 | Cretella | 29/402.18 |
| 4,068,111 | 1/1978 | Klupes . | |

Primary Examiner—Elliot A. Goldberg
Attorney, Agent, or Firm—F. J. Baehr, Jr.

[57] ABSTRACT

A method for filling an internal void in a metal component. After internal voids in the metal component are detected and mapped, the metal component is positioned such that an internal void is between two electrodes. The metal component is compressed by the electrodes and an electrical current is applied across the electrodes and the intervening metal component. Suitable selection of electrode compression force, electrical current, and time of application of each will collapse the internal void and cause it to migrate to at least one surface of the metal component where it will appear as a dimple in the surface. The dimple is then metallurgically filled so as to provide the desired surface characteristics and contour of the metal component. The electrical current density in areas adjacent the internal voids is higher than elsewhere in the metal component and thus causes melting of the metal in those areas. Compression of the metal component simultaneously with application of the electrical current across the electrodes enables application of a lower electrical current than would be required without the metal compression.

3 Claims, 4 Drawing Figures

METHOD FOR FILLING INTERNAL CASTING VOIDS

BACKGROUND OF THE INVENTION

This invention relates to filling internal voids in metal components, and more particularly, to a method for simultaneously impressing an electrical current and mechanical compression to metal components containing such internal voids.

Internal voids are common casting defects which normally result from metal shrinkage during solidification or by entrapped gases released upon cooling. Such internal voids (including cracks) can adversely affect the performance of the metal component casting. When the size and/or density of internal voids is less than what is judged allowable, salvage of the metal component is often attempted. The common method for repairing internal voids includes grinding out or otherwise removing portions of the metal component until the internal void is exposed at the ground out surface of the metal component. The resulting grinding cavity and internal void is then metallurgically filled by welding. The aforementioned repair technique is cumbersome, expensive, and time consuming. In some cases the size and/or density of the internal voids is such that the metal component is scrapped and recast.

U.S. Pat. No. 4,068,111 which issued Jan. 10, 1978, illustrates a method for repairing casting defects by removing material from the metal component and providing a smooth cavity. Such method thus necessitates material removal from the metal component casting.

Another commonly used technique for repairing internal voids in castings is hot isostatic pressing (HIP) which generally involves heating a casting in a furnace or other external heating means and then compressing the casting to collapse the internal voids. HIPing thus requires vast heat additions to the casting to make it conducive to compression and thus collapse of the internal voids. The large heating source needed in HIPing is required since heat externally applied to the casting section containing each void tends to flow laterally in the casting and thus dissipate so as to require an extremely large portion of the casting to be heated to the temperature necessary for practical compression thereof. Additionally, where the voids in the casting open to the surface, HIPing can cause oxidation of the internal void surfaces so as to preclude effective filling thereof without first removing such oxide.

Patent 3,606,785 which issued Sept. 21, 1971, illustrates a typical compression of the subject metal components and collapse of internal voids by rolling metal components between rollers. Such technique is most often used immediately following the casting process when the metal component is still in a relatively hot state. Otherwise, the metal component must be reheated with expenditure of large amounts of heat as previously mentioned.

SUMMARY OF THE INVENTION

In accordance with the present invention a method is provided for filling internal voids in metal components when the presence of such internal voids are detected and their position mapped. The invention generally comprises locating the internal void in a metal component, positioning the metal component between two electrodes such that the internal void is between the two electrodes, compressing the metal component between the electrodes, applying an electrical current through the electrodes and the intervening compressed metal component, and metallurgically filling the dimple which forms at the metal component surface as a result of collapse of the internal void. The metal component compression occurs for a predetermined period of time with a predetermined force and the electrical current application similarly occurs for a predetermined time with a predetermined magnitude. The time of metal compression and electrical current application overlap so that both occur simultaneously for at least a portion of the compression and current application cycle. The compression force and/or current magnitude may be varied during their times of application to provide heat treatment and minimize the energy needed to collapse the voids.

BRIEF DESCRIPTION OF THE DRAWINGS

The invention will be more fully understood from the following detail description of a preferred embodiment, taken in connection with the accompanying drawings, in which.

DESCRIPTION OF THE PREFERRED EMBODIMENT

The present invention is concerned primarily with repairing internal voids in castings and other metal components. In the description which follows the invention will be applied to a turbine blade. It should be understood, however, that the invention may be applied to any metal component.

Figure 1:
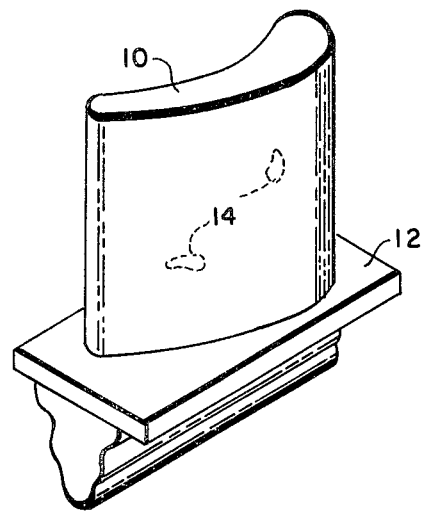
FIG. 1 is an isometric view of an exemplary turbine blade having internal voids.

FIG. 1 illustrates an axial flow turbine blade 10 having an integral platform root 12. Through the use of X-ray or other diagnostic means, the locations of internal voids 14 are determined and preferably mapped on the surface of blade 10. Conventional repair techniques, heretofore, required grinding the metal of the blade 10 from the blade surface down to the voids 14. The resultant opening in the blade was often many times the size of the internal void or defect volume 14. Such opening in blade 10 was then weld filled typically in a manual operation since the openings to the internal defects were not of standard size and/or shape.

Figure 2A:
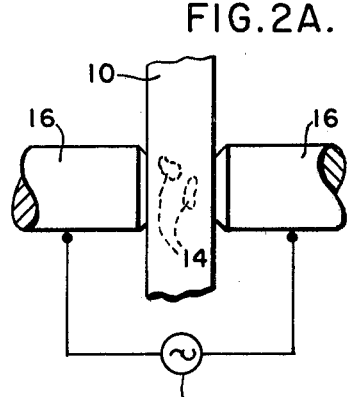
FIGS. 2A and 2B are transverse elevation and schematic views, respectively, of the turbine blade illustrated in FIG. 1.

FIG. 2A illustrates a portion of blade 10 disposed between electrodes 16 such that the portion of blade 10 having internal void 14 is directly between the electrodes 16. As can be seen in FIG. 2A, a current source such as a homopolar generator 18 is connected across the electrodes 16 which are adapted to provide a predetermined compression force to blade 10. By simultaneously applying a predetermined compression force with the electrodes 16 and conducting a current of predetermined magnitude through the electrodes and intervening blade 10, internal voids 14 may be collapsed and caused to migrate to the surface of blade 10. It is to be understood that under certain circumstances it may be advantageous to initiate application of the current prior to applying the compression force.

Figure 2B:
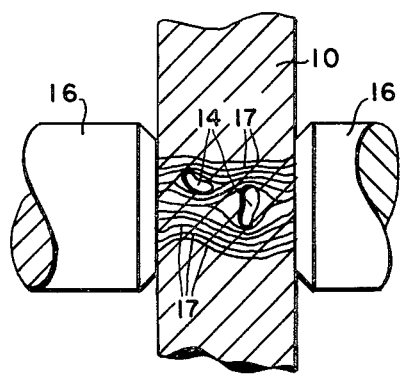

FIG. 2B is a semischematic view of the apparatus illustrated in FIG. 2A. Electron paths 17 may be seen to be more dense about the edges of internal voids 14 so as to produce higher temperatures and cause metal melting at those locations. Such metal melting in combination with the compression force exerted by electrodes 16 facilitate void collapse and simplify repair of the metal component. Since the current magnitude and its time of application are interrelated with the magnitude of the compression force exerted by the electrodes 16, optimum values of each must be determined for specific cases. Furthermore, the magnitude of the compression force and current may be varied to minimize the component heat treatment and minimize the total energy expended in the manufacture of the component. Primary parameters affecting optimum values of the aforementioned variables include the melting point of the metal component's constituents, the metal component's conductivity, the metal component's compression strength, the section thickness where the void resides, and the effective internal void sizes.

For thin sections on the order of $\frac{3}{8}$ to $\frac{1}{2}$ inch having voids of approximately $\frac{1}{8}$ inch to $\frac{1}{4}$ inch the compression force and current requirements may be met by presently existing state-of-the-art spot welders having compression forces of approximately 500 to 2000 pounds and currents of 20,000 to 40,000 amperes in 1-3 seconds. For successively thicker sections and smaller voids, machines having concomitantly higher compression force and current production capabilities are necessary. Use of homopolar generators capable of delivering 0.2 to 3,000,000 amperes within 30 milliseconds can greatly reduce the compression force necessary to collapse internal voids 14.

Figure 3:
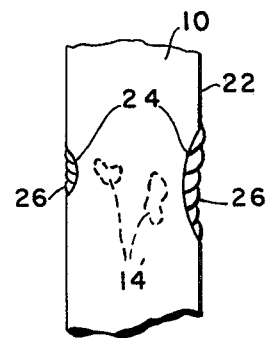
FIG. 3 is an elevation-schematic view of the turbine blade illustrated in FIG. 1 after its repair.

FIG. 3 is a semi-schematic view of the portion of blade 10 previously shown disposed between electrodes 16. As can be seen volume 14' constitutes the same metal as previously surrounded internal voids 14. During application of the current and compression force occurred between FIG. 2B and FIG. 3, internal void 14 migrated to the surface 22 of blade 10 to form dimple 24. Dimple 24, when resident at surface 22, is easily repaired by filling with weld 26 and later smoothing the weld to the desired contour to match the surrounding surface 22.

It will now be apparent that an improved method for repairing internal voids in metal components has been provided in which compression and high electrical current have been simultaneously applied at sections of the metal components where internal voids reside. Cooperative application of the compression force and high current facilitates collapse of the internal voids and causes them to migrate to the surface of the metal component where they may be easily filled with weld metal. One or more voids, depending on its size and density in the metal component, may be eliminated by each compression-current application. For relatively thin metal component sections and relatively large voids, present technology spot welder mechanisms may be used.

I claim:

1. A method of repairing an internal void anywhere within a metal component utilizing a pair of electrodes, said method comprising:
   determining the location of the internal void within the metal component;
   positioning the metal component so that the internal void therein is between the pair of electrodes;
   compressing the metal component in the vicinity of the void between the pair of electrodes with a predetermined force;
   applying an electrical current of a predetermined magnitude through the pair of electrodes, whereby said compression and electrical current collapses the internal void; and
   metallurgically filling a surface resident dimple which resulted from collapse of the internal void.

2. The method of claim 1 wherein said metal compression and electrical current application occur simultaneously.

3. The method of claim 1 wherein said electrical current application is initiated before said metal compression.

* * * * *